United States Patent [19]

Beyts et al.

[11] Patent Number: 4,495,170
[45] Date of Patent: Jan. 22, 1985

[54] SWEETENING AGENTS CONTAINING CHLORODEOXYSUGAR

[75] Inventors: Pamela K. Beyts; Zdenek Latymer, both of Reading, England

[73] Assignee: Tate & Lyle Public Limited Company, England

[21] Appl. No.: 370,967

[22] Filed: Apr. 22, 1982

[30] Foreign Application Priority Data

Apr. 29, 1981 [GB] United Kingdom ............... 8113153

[51] Int. Cl.$^3$ ...................... A61K 31/70; C07H 15/24
[52] U.S. Cl. ........................................ 424/48; 424/49; 424/180; 426/658; 536/18.1; 536/122
[58] Field of Search .................... 424/49, 48; 426/658; 536/122, 18.1

[56] References Cited

U.S. PATENT DOCUMENTS

| 4,085,232 | 4/1978  | Eisenstadt      | 426/658 |
| 4,096,285 | 6/1978  | Burge et al.    | 426/658 |
| 4,117,224 | 9/1978  | Khan et al.     | 536/122 |
| 4,254,154 | 3/1981  | Eisenstadt      | 426/658 |
| 4,271,199 | 6/1981  | Cherukuri et al.| 426/658 |
| 4,296,139 | 10/1981 | Khan et al.     | 536/122 |
| 4,332,830 | 6/1982  | DuBois          | 426/658 |
| 4,343,934 | 8/1982  | Jenner et al.   | 426/548 |
| 4,353,889 | 10/1982 | DuBois          | 424/180 |

FOREIGN PATENT DOCUMENTS 1543167  12/1976  United Kingdom ............... 536/122

Primary Examiner—Johnnie R. Brown
Attorney, Agent, or Firm—Ostrolenk, Faber, Gerb & Soffen

[57] ABSTRACT

Synergized compositions contain a mixture of different sweetening agents, at least one of which is saccharin, stevioside, acesulpham K or other sweetening agent with an associated bitter taste, and at least another of which is a chlorodeoxysucrose, chlorodeoxygalactosucrose or other sweetening agent which is a chlorodeoxysugar.

14 Claims, 2 Drawing Figures

SWEETENING AGENTS CONTAINING CHLORODEOXYSUGAR

BACKGROUND OF THE INVENTION

The present invention relates to sweetening agents, and in particular it relates to compositions embodying the discovery we have now made of a synergistic action between two classes of sweetening agents.

Saccharin, either as itself or as one of its salts, is a widely used synthetic substitute for sucrose. In particular, saccharin is used for instance in sweetening syrups, soft drinks, dietetic and other foods, and pharmaceuticals. Saccharin is usually reckoned to have a sweetness of about 280 times that of sucrose when compared with a 7% w/v aqueous solution of sucrose, though the sweetness value will sometimes depend on the nature of the composition in which the saccharin is employed.

It is well known that accompanying the sweet taste of saccharin a bitter taste is often perceived. For its various uses, saccharin is usually formulated with other ingredients designed to modify and improve the bitter taste of the saccharin and thus of the saccharin-containing composition as a whole. Examples of such taste-modifiers which mask the bitter taste include carbohydrates and cream of tartar.

Generally, it is recognized that some other sweetening agents have not only a sweet taste but also an accompanying bitter taste. The bitter taste is usually perceived at about the same time as the sweet taste, though it is not the dominant taste. The effect has been noticed with several other sweetening agents, for example stevioside (the sweet diterpene glycoside extracted from the leaves of Stevia rebaudiana), and some of the oxathiazinone dioxides (for example acesulpham K, which is 6-methyl-1,2,3-oxathiazin-4(3K)-one 2,2-dioxide).

SUMMARY OF INVENTION

We have now unexpectedly discovered that there exists a class of sweetening agent which, when used with saccharin or other sweetening agent having an associated bitter taste, can give greater sweetness than would be predicted by simple summation of the sweetness contributed by the component sweetening agents. In turn, this finding means that less sweetening agent is needed to achieve a given sweetness.

Specifically, we have found that a synergistic sweetening effect can be obtained using a mixture of different sweetening agents, one of which has an associated bitter taste and the other of which is a chlorodeoxysugar.

Examples of the sweetening agents with an associated bitter taste have already been given. Examples of sweetening agents which are chlorodeoxysugars include the sweet chlorodeoxysucroses and chlorodeoxygalactosucroses such as are described in UK Patent No. 1,544,167. The chlorodeoxysugars of this UK patent are typically several hundred times sweeter than sucrose, but give a similar taste sensation to that given by sucrose.

Further examples of sweet chlorodeoxysugars include the sweet chlorine-substituted disaccharides which are the subject of British patent application No. 8,034,666 and other applications claming priority therefrom, including British patent application No. 8,131,110, publication No. 2088855. The compounds of UK No. 2088855 are 4-chloro-4-deoxy-α-D-galactopyranosyl 1,4,6-trichloro-1,4,6-trideoxy-β-D-hexulofuranosides in which the 3' and 4' substituents have a trans configuration to each other. Such compounds include 1,4,6-trichloro-1,4,6-trideoxy-β-D-fructofuranosyl4-chloro-4-deoxy-α-D-galactopyranoside and can readily be made by direct chlorination of a sucrose derivative blocked in the 6-position (for example by esterification) but free in the 4'-position and in the 4-,1'- and 6'-positions, with subsequent removal of the blocking group from the 6-position. The chlorination preferably uses sulphuryl chloride with pyridine and chloroform.

According to the present invention, there is provided a synergised composition containing a mixture of different sweetening agents, at least one of which is saccharin, stevioside, acesulpham K or other sweetening agent with an associated bitter taste, and at least another of which is a chlorodeoxysucrose, chlorodeoxygalactosucrose or other sweetening agent which is a chlorodeoxysugar.

It was surprising to discover that the sweetness of the chlorodeoxysugar sweeteners is not detrimentally affected by the incorporation of the other sweetening agents having an associated bitter taste. Seemingly there is some characteristic of the sweet chlorodeoxysugars which enables them not only to mask the bitter note associated with certain sweeteners but also to allow better development of a true sweet taste. As a result of this unexpected finding, the compositions of this invention are noticeably sweeter than would be predicted on a simple additive basis from the knowledge of the sweetening strength of the component sweeteners.

For example, we have found that a strong synergistic sweetening effect can be obtained with mixtures of saccharin or other sweetening agent with associated bitter taste and 4-chloro-4-deoxy-α-D-galactopyranosyl-1,6-dichloro-1,6-dideoxy-β-D-fructofuranoside, also known as 4,1',6'trichloro-4,1',6'-trideoxygalactosucrose and referred to herein as "TGS".

In practice, and as indicated above, there is an unexpected synergy between sweet chlorodeoxysugars and sweetening agents having an associated bitter taste, with the result that the total sweetness is in fact greater than the predicted value. The origin of this effect is unclear, particularly since we could find no evidence for synergy of TGS with other sweeteners such as sucrose.

PREFERRED EMBODIMENTS

For preference, the sweetness contributed by the sweetening agent with associated bitter taste and by the sweet chlorodeoxysugar is in the ratio 4:1 to 1:4, more preferably 2:1 to 1:2. If the sweetening power of the sweetening agent with associated bitter taste is x, relative to 5% sucrose solution, and if the sweetening power of the sweet chlorodeoxysugar is y, then the compositions of this invention preferably contain the sweetening agent with associated bitter taste and the sweet chlorodeoxysugar in the weight ratio of from 1/x to 4/x of the sweetening agent with associated bitter taste to from 1/y to 4/y of the sweet chlorodeoxysugar.

In particularly preferred compositions of this invention, the sweetness contributed by the two classes of sweetening agent is about equal, and the amounts of the two are approximately in the weight ratio of y:x for the ratio of the amount of sweetening agent with associated bitter taste to the amount of sweet chlorodeoxysugar.

The compositions of this invention include ingestible, oral or sweetening compositions.

The ingestible compositions comprise compositions which are intended to be swallowed, for instance a foodstuff or beverage, or a pharmaceutical composition administered per os.

The oral compositions comprise compositions intended to be taken into the mouth but not ingested as such, for instance a toothpaste, dental lotion, chewing gum or mouth wash.

The sweetening compositions comprise compositions which are intended to be used to sweeten other compositions, including ingestible and oral compositions. The sweetening compositions may consist of a mixture of the sweet chlorodeoxysugar and sweetening agent having an associated bitter taste, but more usually will further contain a solid or liquid carrier or extender. The sweetening compositions can for example take the form of granules, tablets or drops.

The present invention extends to methods of making the ingestible, oral and sweetening compositions. In such a method, a composition is made by admixing the sweet chlorodeoxysugar and sweetening agent having an associated bitter taste. Other ingredients will usually be incorporated, as dictated by the nature of the desired composition.

The skilled worker will be familiar with the use of conventional sweetening substances in the formulation of compositions which are taken into the mouth, and this familiarity can be applied without difficulty to the formulation of compositions which embody the present invention.

The existence of the synergistic effect upon which the present invention is based is shown by the following experiments.

DESCRIPTION OF DRAWINGS

In the experiments, reference is made to the accompanying drawings, in which.

The experiments were carried out using a taste panel. All panelists were experienced and well acquainted with procedures for estimating sweetness intensity.

Sweetness intensity was estimated by a sample matching procedure. In this procedure, five sucrose solutions of increasing concentration are presented as reference samples, each panelist being required to indicate which of these reference samples is equi-sweet with a single test solution of known concentration. The process is then repeated at different concentrations to determine the relationshop between sweetness intensity and concentration. This procedure was carried out with TGS, saccharin and aspartame.

Experiment 1

Figure 1:
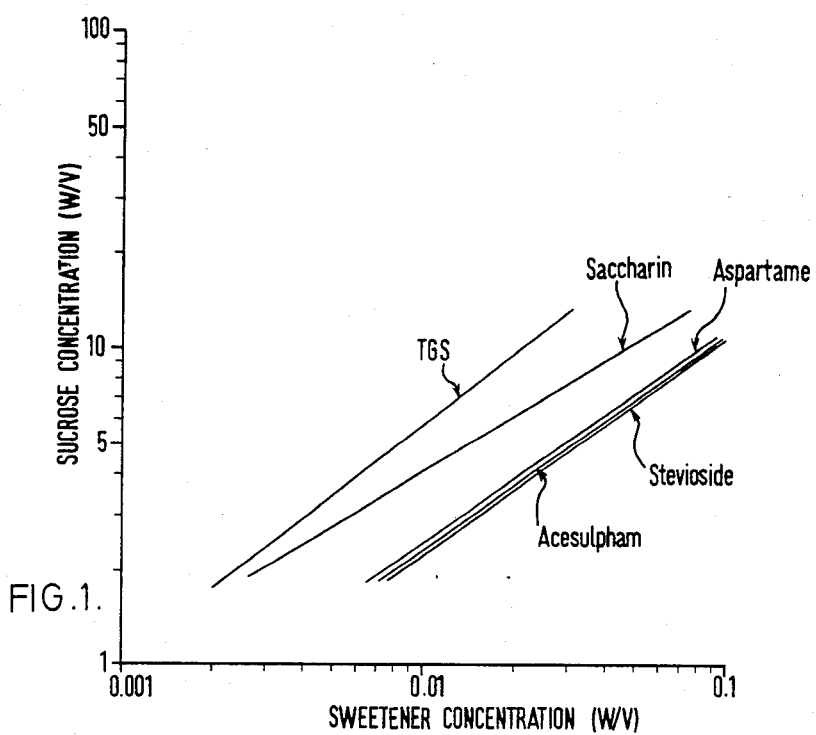
FIG. 1 shows how the sweetness intensities of TGS and other sweetening agents vary with concentration, and FIG. 2 demonstrates the synergistic effect between TGS and saccharin.

FIG. 1 illustrates how the sweetness intensities of TGS and saccharin vary with concentration. From this figure, the amount of sweetener required in a mixture in order to contribute a sweetness equal in intensity to a given sucrose solution can be found.

Thus, on a simple, additive basis, a solution which contains 0.008% TGS or 0.014% saccharin should each have a sweetness equal to 5% sucrose solution, and a mixed solution containing 0.008% TGS and 0.014% saccharin should be as sweet as 10% sucrose solution.

The observed sweetness intensity of mixtures of TGS and sucrose, saccharin or aspartame was determined. Five reference sucrose solutions of increasing concentration were presented and matching of a single test solution with one of these sucrose solutions was required. In this way it was possible to determine whether or not there was any synergy between sweeteners.

The results are given in Tables 1 and 2 which respectively show the theoretical and actual sweetness (Table 1), and the sweetness difference and synergy (Table 2).

TABLE 1

Sweetness intensity of TGS: aspartame, TGS: sucrose and TGS: saccharin mixtures

| Mixture composition (% contribution) | Theoretical equi-sweet sucrose concentration (%) | Actual equi-sweet sucrose concentration (%) |
|---|---|---|
| 40% TGS with 60% aspartame | 5.0 | 5.06 |
| 60% TGS with 40% aspartame | 10.0 | 10.28 |
| 40% TGS with 60% sucrose | 5.0 | 4.94 |
| 60% TGS with 40% sucrose | 10.0 | 10.56 |
| 40% TGS with 60% saccharin | 5.0 | 5.78 |
| 60% TGS with 40% saccharin | 10.0 | 11.48 |

TABLE 2

Sweetness intensity of TGS: aspartame, TGS: sucrose and TGS: saccharin mixtures

| Mixture composition (% contribution) | Difference | Synergy |
|---|---|---|
| 40% TGS with 60% aspartame | +1.1% | NO |
| 60% TGS with 40% aspartame | +2.8% | NO |
| 40% TGS with 60% sucrose | −1.1% | NO |
| 60% TGS with 40% sucrose | +5.6% | marginal |
| 40% TGS with 60% saccharin | +15.6% | YES |
| 60% TGS with 40% saccharin | +14.8% | YES |

From Table 2, it can be seen clearly that synergy is demonstrated between TGS and saccharin, but not between TGS and aspartame, or TGS and sucrose.

A more detailed examination of the sensory properties of mixtures of TGS and saccharin was performed. The results are given in Table 3 and graphically displayed in FIG. 2.

TABLE 3

Detailed examination of TGS: Saccharin synergy

| Mixture composition (% contribution to total sweetness) | Theoretical equi-sweet sucrose concentration (%) | Actual equi-sweet sucrose concentration (%) | Difference (%) |
|---|---|---|---|
| 5% TGS with 95% saccharin | 7.0 | 7.17 | +2.4 |
| 10% TGS with 90% saccharin | 3.0 | 3.28 | +9.3 |
| 20% TGS with 80% saccharin | 7.0 | 7.93 | +13.3 |
| 40% TGS with 60% saccharin | 5.0 | 5.78 | +15.6 |
| 60% TGS with 40% saccharin | 10.0 | 11.48 | +14.8 |
| 80% TGS with | 7.0 | 7.52 | +7.4 |

TABLE 3-continued

| Detailed examination of TGS: Saccharin synergy | | | |
|---|---|---|---|
| Mixture composition (% contribution to total sweetness) | Theoretical equi-sweet sucrose concentration (%) | Actual equi-sweet sucrose concentration (%) | Difference (%) |
| 20% saccharin 90% TGS with 10% saccharin | 3.0 | 3.13 | +4.3 |

Figure 2:
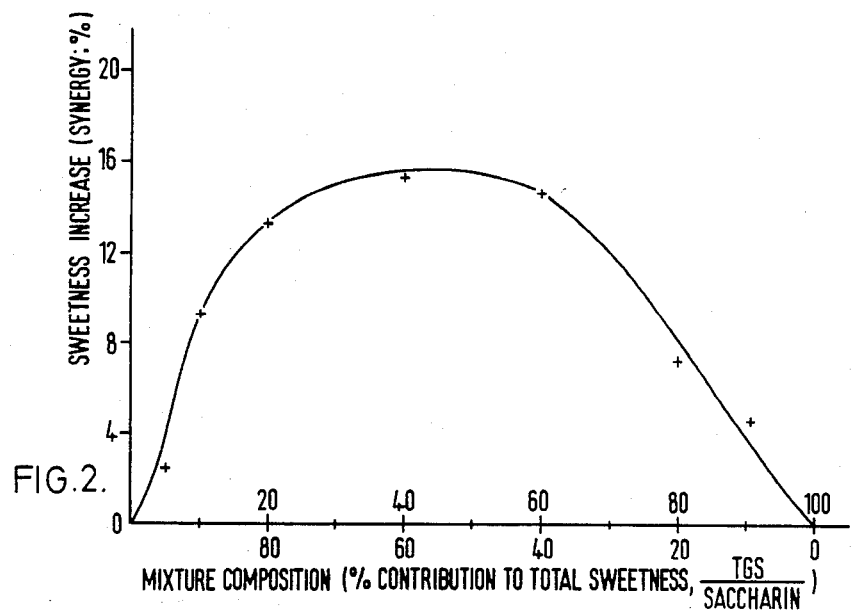

Particularly from FIG. 2, it is evident that there is a strong synergy between TGS and saccharin, resulting in an enhancement of the sweetness by up to 16%.

In a similar manner to the experiments with TGS and saccharin, the properties of TGS with acesulpham K and TGS with stevioside were examined. The results are given in Table 4 and 5 in a manner analogous to those in Table 3.

TABLE 4

| Detailed examination of TGS: acesulpham K synergy | | | |
|---|---|---|---|
| Mixture composition (% contribution to total sweetness) | Theoretical equi-sweet sucrose concentration (%) | Actual equi-sweet sucrose concentration (%) | Difference (%) |
| 17% TGS with 83% acesulpham K | 6 | 6.43 | +7.2 |
| 33% TGS with 67% acesulpham K | 6 | 6.53 | +8.8 |
| 50% TGS with 50% acesulpham K | 6 | 6.54 | +8.9 |
| 67% TGS with 33% acesulpham | 6 | 6.59 | +9.8 |
| 83% TGS with 17% acesulpham K | 6 | 5.89 | −1.8 |

TABLE 5

| Detailed examination of TGS: stevioside synergy | | | |
|---|---|---|---|
| Mixture composition (% contribution to total sweetness) | Theoretical equi-sweet sucrose concentration (%) | Actual equi-sweet sucrose concentration (%) | Difference (%) |
| 17% TGS with 83% stevioside | 6 | 6.66 | +11 |
| 33% TGS with 67% stevioside | 6 | 6.86 | +14.3 |
| 50% TGS with 50% stevioside | 6 | 7.02 | +17.0 |
| 67% TGS with 33% stevioside | 6 | 6.77 | +12.8 |
| 83% TGS with 17% stevioside | 6 | 6.63 | +10.5 |

From Tables 4 and 5, it is evident that there is a strong synergy between TGS and acesulpham K or stevioside, resulting in enhancements of the sweetness by up to 10% for acesulpham K and by up to 17% for stevioside.

Using the information such as is provided by the Tables and Figures, the skilled man will have no difficulty in formulating compositions that employ the synergy to advantage.

EXAMPLES OF INVENTION

Examples of compositions embodying the present invention will now be given. These Examples illustrate the synergy between TGS and saccharin, but other sweetener agents can be subtituted. For instance, the saccharin can be replaced by twice its weight of stevioside or acesulpham K in the following Examples:

EXAMPLE 1

Sweetening tablets.

To a mixture of 97 g lactose and 3 g gum arabic was added sufficient 20% gum arabic solution (12–13 g) until balls could be formed by the pasty mixture. After thorough mixing, the mix was granulated and the granules dried. 42 g of this base was mixed with 5 g saccharin, 2.5 g TGS, 1g gum arabic and 3 g sodium stearate. This mixture was then tabletted to give tablets each weighing approximately 65 mg.

EXAMPLE 2

Low calorie carbonated beverage.

A cola-flavoured carbonated beverage was made to the composition (in parts by weight)
phosphoric acid: 12
sodium citrate: 1
sodium benzoate: 2.5
caramel: 25
cola essence: 11
saccharin: 1.7
TGS: 0.8
carbonated water: 9946.0

EXAMPLE 3

Low calorie pie fillings.

A lemon-flavoured filling was formulated as follows (in parts by weight)
corn starch: 3.6
non-fat dried milk: 1.2
sodium saccharin: 0.042
TGS: 0.02
lemon flavour: 0.1
calcium carrageenan: 0.06
permitted colour: to suit
sodium citrate: 1.5
milk: 93.0

We claim:

1. A sweet composition comprising a synergistic mixture of, at least one sweetening agent with an associated bitter taste selected from the group consisting of saccharin, stevioside and acesulpham K, and at least one sweet chlorodeoxysugar sweetener selected from the group consisting of chlorodeoxysucrose and chlorodeoxygalactosucrose.

2. The composition of claim 1, wherein said chlorodeoxysugar is 4-chloro-4-deoxy-α-D-galactopyranosyl-1,6-dichloro-1,6-dideoxy-β-D-fructofuranoside.

3. The composition of claim 1, wherein said sweetening agent with an associated bitter taste sweetening agent is saccharin.

4. The composition of claim 3, wherein said chlorodeoxysugar is 4-chloro-4-deoxy-α-D-galactopyranosyl-1,6-dichloro-1,6-dideoxy-β-D-fructofuranoside.

5. The composition of claim 1, wherein said ratio is 2:1 to 1:2.

6. The composition of claim 1, which contains from 1/x to 4/x parts by weight of said sweetening agent with associated bitter taste and from 1/y to 4/y parts by weight of said sweet chlorodeoxysugar, wherein x is the sweetening power of said sweetening agent with associated bitter taste relative to 5% sucrose solution, and y is the sweetening power of said sweet chlorodeoxysugar relative to 5% sucrose solution.

7. The composition of claim 6, wherein the sweetness contributed by the sweetening agent with associated bitter taste and said sweet chlorodeoxysugar is about equal, and the amounts of the two are approximately in the weight ratio of y:x.

8. The composition of claim 1, which is selected from the group consisting of ingestible, oral and sweetening compositions.

9. In a method of making an ingestible, oral or sweetening composition, in which method a sweetener is admixed with other ingredients as dictated by the nature of the desired composition, the improvement which comprises employing as said sweetener, a synergistic mixture of a sweet chlorodeoxysugar sweetener selected from the group consisting of chlorodeoxysucrose and chlorodeoxygalactosucrose and a sweetening agent having an associated bitter taste selected from the group consisting of saccharin, stevioside and acesulpham K, wherein the sweetness contributed by said sweetening agent with associated bitter taste and by said sweet chlorodeoxysugar is in the ratio 4:1 to 1:4.

10. The composition of claim 1 wherein said sweetening agent with an associated bitter taste is stevioside.

11. The composition of claim 1, wherein said chlorodeoxysugar is 4-chloro-4-deoxy-α-D-galactopyranosyl-1,6-dichloro-1,6-dideoxy-β-D-fructofuranoside.

12. The method of claim 9 wherein said sweetening agent with an associated bitter taste is saccharin.

13. The method of claim 12 wherein said chlorodeoxysugar is 4-chloro-4-deoxy-α-D-galactopyranosyl-1,6-dichloro-1,6-dideoxy-β-D-fructofuranoside.

14. The composition of claim 1 wherein said sweetening agent with an associated bitter taste is acesulpham K.

* * * * *